(No Model.)
H. S. CROMBIE.
MANUFACTURE OF LACING STUDS.
No. 549,107. Patented Nov. 5, 1895.
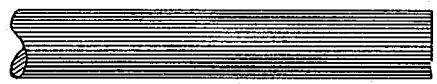
Fig. 1.
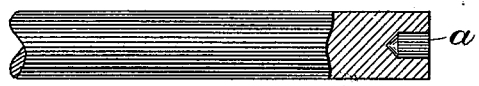
Fig. 2.
Fig. 3.
Fig. 4.
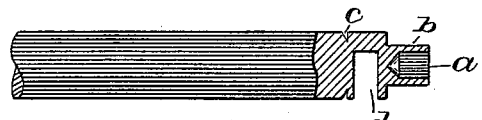
Fig. 5.
    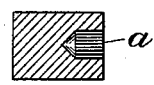    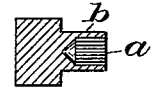
Fig. 6.    Fig. 7.    Fig. 8.
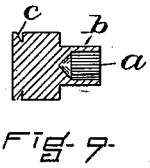    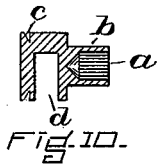
Fig. 9.    Fig. 10.
WITNESSES.            INVENTOR.
N. U. Walker.           Herbert S. Crombie
L. C. Sargent.

UNITED STATES PATENT OFFICE.

HERBERT S. CROMBIE, OF WALTHAM, ASSIGNOR OF ONE-HALF TO THEOPHILUS KING, OF BOSTON, MASSACHUSETTS.

MANUFACTURE OF LACING-STUDS.

SPECIFICATION forming part of Letters Patent No. 549,107, dated November 5, 1895.

Application filed March 1, 1895. Serial No. 540,201. (No specimens.)

*To all whom it may concern:*

Be it known that I, HERBERT S. CROMBIE, a citizen of the United States, residing at Waltham, in the county of Middlesex and State of Massachusetts, have invented a new and useful Improvement in the Manufacture of Lacing-Studs, of which the following is a specification.

My invention has for its object to improve the methods of manufacturing lacing studs or hooks having the shank hollow, the neck of a different axis from that of the shank, and a head supported upon said neck, and also to make a perfectly beveled or smooth neck to avoid unduly wearing away the lacing and to provide, if desired, a channel upon the side of the stud-head by which enamel may be held thereon.

I prefer to utilize my method of manufacture in connection with a rod or wire, although it will be evident that I may use cylindrical blanks of the proper length after the same have been cut from a metal rod or otherwise prepared.

My invention consists in boring the metal to obtain the hollow in the shank, in cutting down the metal surrounding the hollow portion to form the shank, in cutting out a slot from the metal above the shank, leaving a thin shoulder between said slot and the shank, and (but only if it be desired to enamel the stud) cutting a trench upon the side of the stud to assist in holding the metal above the slot to assist in holding the enamel, and in severing the completed stud from the metal. As will be seen, the latter operation of cutting the stud part from the main body of the wire may be first performed if my method is to be utilized upon separate blanks.

Reference to the drawings will plainly show the application of my method.

Figure 1 is a section of rod or wire. Fig. 2 shows the hollow *a* for the shank. Fig. 3 shows the part *b* cut away to complete the shank. Fig. 4 shows the trench *c* for holding the enamel. Fig. 5 shows the slot *d*, and Fig. 10 shows the completed lacing-stud as it appears after having been cut off from Fig. 5. Fig. 6 is a blank of the proper size for the stud, and Figs. 7, 8, and 9 show the same steps in the process and the same results as do Figs. 2, 3, and 4, while Fig. 10 represents the completed stud.

It will thus be seen that my improved method of making these articles consists in general in selecting a long rod or wire of proper diameter and in either performing the hereinafter-mentioned steps upon a portion of said rod before cutting off any part of it or in cutting off a section, as Fig. 6, and performing the operations upon that section.

Of course I do not confine the application of my process to either a rod or a section of a rod, as the blanks may, if desired, be otherwise obtained; but I comtemplate the chief use of my process to be in manufacturing these studs from metal rod or wire.

The steps included in my method of manufacture are therefore the boring out by any proper tool of a hollow in the part of the metal which is to constitute the shank, in cutting away the part of the periphery to complete the shank, in cutting a slot so deep into the metal above the shank as to leave a neck, as shown in Fig. 10, whose axis will not be the same as the axis of the shank, and also in forming that neck with a smooth circular surface to avoid wearing away of the lacing, in cutting a trench, as described, and in cutting off the completed stud from the wire. As mentioned above, this last step may be taken first.

Hitherto the hollow shank of this class of rivets has been formed by boring or by what is known as the "spinning operation," while the desired form of the completed stud has been obtained by different processes than the one herein set forth.

Of course the boring of the shank part, the cutting down of the shank part, the slotting of the head, the channeling of the side of the head, and the cutting off of the completed rivet are operations which may be done by various mechanism or by hand or partly by mechanism and by hand.

In another application filed simultaneously with this application I have shown, described, and claimed a machine for manufacturing such lacing-studs, and my method of treating the metal rod or blank to obtain such lacing-studs may be entirely carried out by that machine, if desired.

I claim—

1. The method of manufacturing hollow shank lacing studs or hooks from rod or wire, which consists in the following steps:—boring the end of the rod; partially cutting away the periphery of the metal around the bore; cutting out a slot above said shank so as to leave a smooth neck having a different axis from that of the shank; channeling a groove in the portion above the slot; and cutting off a length of the wire sufficient to leave a stud-head, substantially as described.

2. The method of manufacturing hollow shank lacing studs or hooks, which consists in the following steps:—boring one end of the blank; partially cutting away the periphery of the metal around the bore; cutting out a slot above said shank so as to leave a smooth neck having a different axis from that of the shank; substantially as described.

In testimony whereof I have hereunto set my hand this 28th day of February, 1895.

HERBERT S. CROMBIE.

In presence of—
 NATHANIEL U. WALKER,
 L. C. SARGENT.